United States Patent [19]

Speyer

[11] 4,132,689

[45] Jan. 2, 1979

[54] THERMOPLASTIC WORKHOLDING COMPOSITION AND METHOD OF HOLDING A WORKPIECE

[75] Inventor: Fred B. Speyer, Euclid, Ohio

[73] Assignee: TRW Inc., Cleveland, Ohio

[21] Appl. No.: 838,488

[22] Filed: Oct. 3, 1977

[51] Int. Cl.$^2$ .................... B24B 19/14; C08L 91/00
[52] U.S. Cl. ................. 260/23 R; 156/334; 260/23 H; 260/28.5 A; 260/28.5 B; 264/237; 264/259; 264/267; 269/7
[58] Field of Search .................. 260/23, 28.5 A, 23 R, 260/23 H, 28.5 B; 156/155, 334; 264/267, 259, 237; 269/7

[56] References Cited

U.S. PATENT DOCUMENTS

| | | | |
|---|---|---|---|
| 3,319,289 | 5/1967 | McCormick | 269/7 |
| 3,586,559 | 6/1971 | Shepard | 156/155 |
| 3,748,155 | 7/1973 | Speyer | 106/38.25 |
| 3,790,152 | 2/1974 | Parsons | 269/7 |
| 3,837,994 | 9/1974 | Flanagan et al. | 156/334 |
| 3,854,962 | 12/1974 | Speyer | 106/38.7 |
| 3,897,535 | 7/1975 | Lapac et al. | 264/237 |
| 3,921,343 | 11/1975 | Speyer | 260/28.5 A |

Primary Examiner—Ronald W. Griffin

[57] ABSTRACT

There is provided an improved thermoplastic hot-melt composition for use in holding a workpiece, e.g. a jet engine airfoil or blade. The composition comprises a filled, normally solid resinous material which is a blend of a dimeric fatty acid containing 32 to 40 carbon atoms, a $C_5$–$C_6$ alkylene hydrocarbon polymer, and a nonpolar aromatic hydrocarbon polymer, said blend having dispersed therein a finely divided inorganic filler material, particularly a ceramic oxide. A method of potting a workpiece with such a composition is also disclosed. The organic portion is novel and useful not only in composing the present potting compositions, but also in forming encapsulating compositions.

19 Claims, 6 Drawing Figures

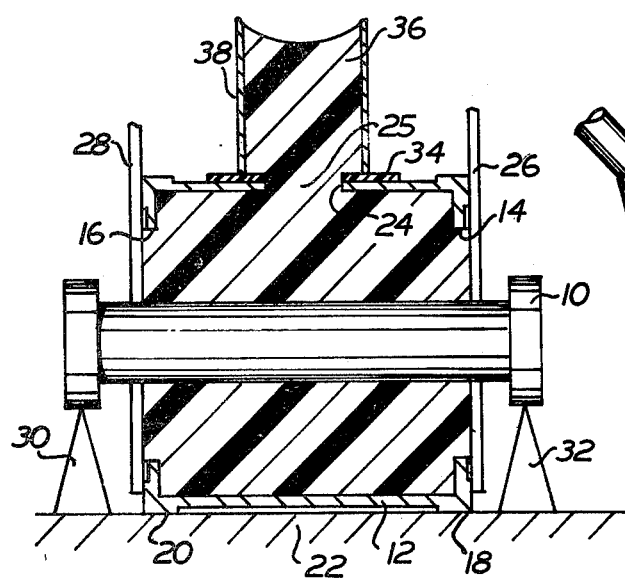
FIG. IA
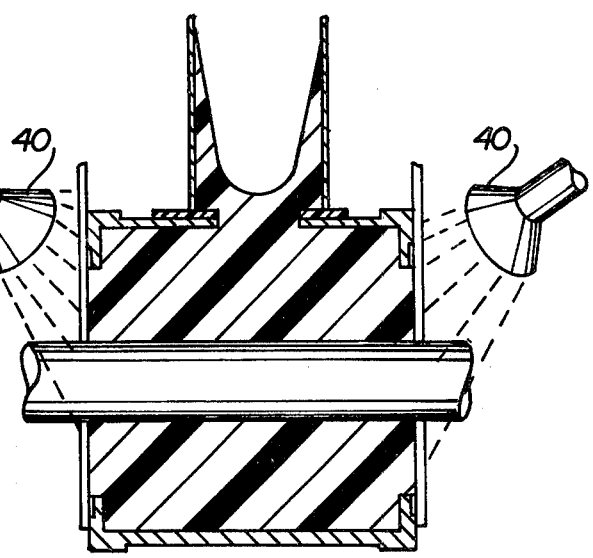
FIG. IB
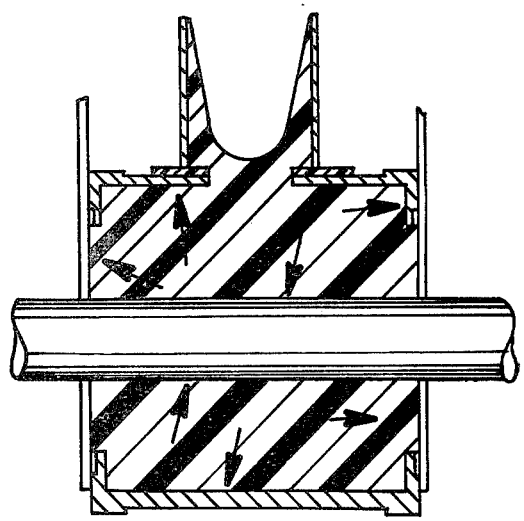
FIG. IC
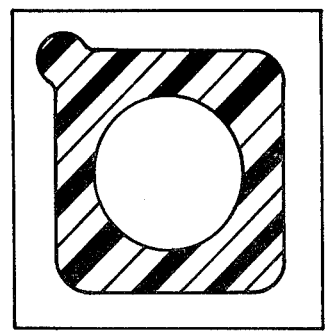
FIG. 2

THERMOPLASTIC WORKHOLDING COMPOSITION AND METHOD OF HOLDING A WORKPIECE

RELATED APPLICATION

This application is related to my concurrently filed application Ser. No. 838,481.

BACKGROUND OF THE INVENTION AND PRIOR ART

Much of the prior art of matrix fixturing or potting centers on the use of low melting metallic alloys having controlled shrinkage characteristics. See, for example, U.S. Pat. Nos. 3,790,152 and 3,982,430. These materials provide a matrix for holding a wide range of metal parts for drilling, grinding, lapping, milling and turning operations. Certain metallic alloys in which bismuth or antimony are incorporated give molten metal alloys which expand upon solidification thus providing excellent duplication and reproduction. There are, however, many commercial fixturing operations where these metallic alloys do not provide optimum results. The weight of these alloys in fixturing large parts poses a processing problem; their high cost makes for an expensive inventory problem, and the loss of any of the alloy during processing is a serious economic disadvantage. Contamination caused by metal such as bismuth, cadmium, lead and tin contained in such materials is extremely damaging in the fixturing of jet engine parts, for example.

One of the major obstacles to wider utilization of thin wall, odd-shaped, fragile and nonmagnetic parts has been the relatively inflexible method by which they are mechanically potted for machining. Production difficulties in supporting these parts are caused by vibration and chatter, distortion, fracturing, deflection, interrupted cuts, rapid consumption of cutting tools, heavy burring, high scrap rate and secondary repairs. Typical material requirements for jet engine blade staging are as follows:

(1) The material should have the rigidity of lead at room temperature or below.
(2) The material should be pourable and have a set up time of about 2-3 minutes.
(3) The material should have minimum shrinkage and not be appreciably soluble in machining coolants.
(4) Sequentially cast material should be mutually adherent.
(5) The material should be easily removable from machined parts in such a manner as not to damage the parts. Any residual material should not attack the parts or coatings at temperatures as high as 2000° F.
(6) The material should be nontoxic, nonflammable and relatively odorless.
(7) The material should be relatively inexpensive and reusable.
(8) The material should have good shelf life and a pot life at application temperature.

In addition to the above, it is a principal objective in the formulation of the present improved potting compositions to provide relatively low viscosity at temperatures below 300° F. preferably less than 260° F. and a rapid cool down and hardening time.

Heretofore, organic compositions have been used in a potting process. For example, reference may be had to the U.S. Pat. No. to Lapac et al., 3,897,535. This patent discloses a process for potting a workpiece including disposing a liquid organic resin work holding material within a work holder around the workpiece and quenching the assembly at between 40° F. and 73° F. to solidify the work holding material. The cold quench within this particular temperature range gives improved holding strength and reduces shrinkage of the organic work holding material. According to the patented process, ceramic stones are heated to a relatively high temperature (800° F.) and disposed within the work holder to heat the work holder and the workpiece prior to pouring the work holding material into the work holder. The stones further increase the holding strength of the work holding material and reduce shrinkage even more. Glass balls may be used in place of ceramic stone. These stones are of substantial diameter, preferably between one-eighth and two-tenths of an inch in diameter. Smaller sized stones or balls do not permit proper flow of wax into the work holding cavity. Stones or balls of a greater size while they may perform satisfactorily in heating the workpiece do not add much strength to the solidified composition. The organic resin material may be any wax or thermoplastic which is solid at room temperature.

Other references of interest in this field include Speyer U.S. Pat. Nos. 3,921,343; 3,748,155 and 3,854,962; Shepard 3,586,559 and McCormick 3,319,289.

The present invention is an improvement in an organic material for potting. By the process of the present invention and the composition utilized herein, the operations of separately filling the work holder with the ceramic stones or glass balls followed by pouring a molten fixturing composition thereover are avoided. The hazards of handling 800° F. stones are avoided. Moreover, the necessity for recovering the glass balls or ceramic stones is obviated thereby reducing the number of operations and the cost of recovery of materials. Compositions of the present invention have all of the desired properties for potting of devices such as jet engine blades while achieving these objectives in a more economical and useful manner. The inorganic filler material does not need to be removed from the composition in order that the composition may be properly reused. The compositions hereof have excellent shelf life, and even when molten undergo minimum settling of the inorganic moiety. The improved elastomerized resin systems hereof provide hardness and toughness essential to tool handling during machining operations.

Still further, because of the relatively large size of the stones used in accordance with the practice of the prior art method and the relatively large sections of interstitial resin of low heat conductivity, the amount of time for quenching the workpiece container after being filled with the stones and the fixturing composition is still relatively high, e.g. 5-10 minutes. This unnecessarily extends the time for such operations as the fixturing and further working of jet engine blades, for example. In such an operation, time is of the essence and set-up time can be materially reduced, e.g. to as short as 2-3 minutes. The improved composition of the present invention and the improved potting process, enables the time of quenching to be substantially reduced over that heretofore required.

BRIEF STATEMENT OF THE INVENTION

Briefly stated, the present invention is in a resinous thermoplastic hot melt composition composed of an organic moiety and an inorganic moiety. The organic moiety is composed of hydrocarbon polymers, preferably an alkylene hydrocarbon polymer e.g. a polyterpene; and an aromatic hydrocarbon polymer. A plasticizer, e.g. a high molecular weight unsaturated fatty acid, such as dilinoleic acid may be advantageously present. The inorganic moiety is preferably a finely divided inorganic filler, e.g. aluminum oxide, which is intimately dispersed in the organic material. The inorganic filler material is present in the range of from 5–70 parts per 100 parts of the potting composition, and preferably from 50–70 parts per 100 parts of the composition.

The present invention also contemplates a method of potting a workpiece in a workpiece-container by casting about the workpiece supported within the container the foregoing filled resinous thermoplastic hot melt composition at an elevated temperature, cooling the assembly to a temperature below room temperature, and then warming the assembly to room temperature either by application of relatively low heat or by allowing the assembly to regain room temperature spontaneously. After the device is mechanically operated upon as indicated above, the filled resinous material may be recovered simply by elevating the temperature to a point where the filled resinous material again becomes fluid, and removing the part from the workpiece container. The filled organic resinous potting composition may then be recovered and reused indefinitely. The composition is stable, nonreactive with the workpiece and easily removed therefrom without introducing contaminants of a deleterious nature.

BRIEF DESCRIPTION OF THE DRAWINGS

The process of the present invention may be better understood by having reference to the annexed drawings wherein:

FIGS. 1a, 1b, and 1c are diagrammatic and schematic illustrations of successive stages in the conduct of the improved method of the present invention;

FIG. 2 is an end view in cross section of a potted workpiece with the "scissors" and sprue removed;

DETAILED DESCRIPTION OF THE DRAWINGS AND SPECIFIC EXAMPLES

Figure 4:
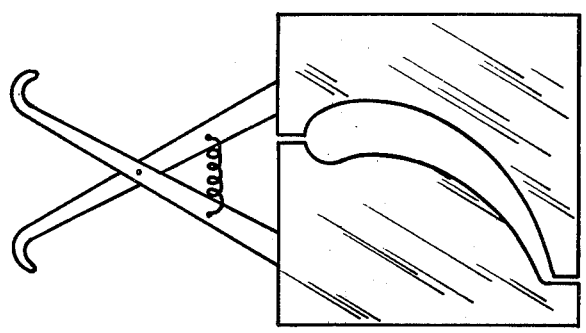
FIG. 4 is a showing of a "scissors" closure for a potting box adapted for an airfoil for a jet engine.

In FIG. 1a there is shown in diagrammatic form a potting or matrix box in which the compositions of the present invention may be used. The matrix box 12 may be a cast iron box having opposed openings 14 and 16 of sufficient dimension to freely pass at least one end of a workpiece 10. The box 12 may also be provided with ground flats, e.g. flats 18 and 20 for proper location on a fixturing table 22. The matrix box 12 is also provided with an inlet opening 24 for admitting a potting composition 25 as described below. End closures 26 and 28, which are designated "scissors" herein for reasons which will become apparent, are provided to close the openings 14 and 16 and accommodate the projecting ends of the workpiece 10. Suitable clamps, not shown, hold the scissors closures 26 and 28 in place.

The workpiece is supported on suitable fixturing mounts or pedestals 30 and 32 diagrammatically shown in FIG. 1a for maintenance of proper location of the workpiece 10 in the matrix box 12 during the potting operation, as is well known.

The apparatus is completed with a Teflon collar 34 to facilitate removal of a sprue 36, and a filler pipe 38 to aid in introducing the potting composition 25. Pipe 38 also provides a reservoir for additional composition 25 as may be required during shrinkage in cooling as described below.

Figure 3:
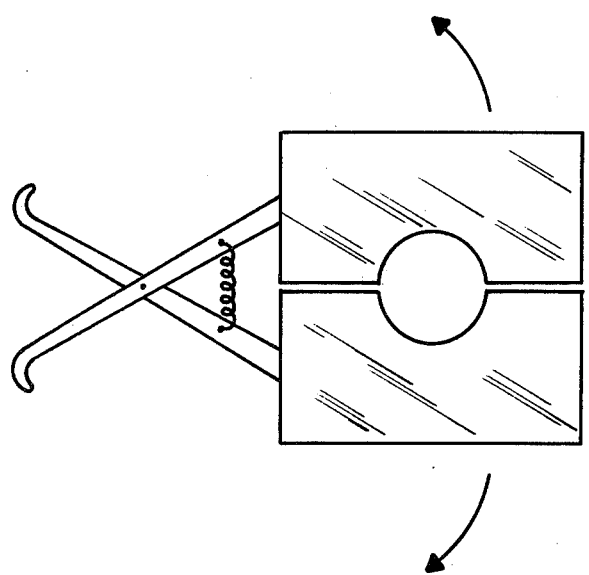
FIG. 3 is a showing of a "scissors" closure for a potting box adapted for a cylindrical workpiece.

In practice, the workpiece 10, e.g. a jet engine turbine blade or airfoil, is inserted through the openings 14 and 16 in the matrix box 12. Both the workpiece 10 and the matrix box 12 are preferably preheated to a temperature of from about 115° F. to about 130° F. (46°–55° C.) and mounted in a fixturing assembly to properly locate the workpiece 10 relative to the matrix box 12. The preheat temperature is not so high that it results in injury to one handling the parts. The end closures 24 and 28 or "scissors" such as shown in FIGS. 3 and 4 are put in place and clamped to close the openings 14 and 16 and contain the hot resinous melt in the matrix box 12. A Teflon washer separator 34 is placed around the opening 24 and the preferably preheated metal inlet pipe 38 superposed. The function of the pipe 38 is to contain a volume of the potting composition 25 in excess of that required to fill the container 12 with the workpiece in place. This excess provides a hydrostatic head for urging flow of the hot melt composition to all portions of the box 12 and to provide an additional volume to keep the receptacle filled during contraction of the composition 25 which occurs upon cooling.

As indicated above, the potting compositions of the present invention are composed of an inorganic moiety and an organic moiety. The composition flows at elevated temperatures in the range of 250° F. to 300° F. (120°–150° C.) or higher and is a rigid solid at room temperature. It is poured preferably at from 250° F.–270° F. into the preheated box 12 to fully pot the workpiece, and is set by application of cooling water to the box 12 and the projecting portion or portions of the workpiece 10. Application of cooling water to the pipe 38 should be avoided during the filling operation and until set is achieved.

The hot liquid resin composition 25 is added until the tube 38 is almost full. Liquid quenching to set the potted part 10 is accomplished either by immersing the entire assembly in cold water, or flooding the apparatus with water by means of a drenching spray system generally indicated at (FIG. 1b) or a combination of both simultaneously or sequentially carried out. The potted part 10 must remain in the fixturing device 20, 30 and 32, for example until cooled sufficiently that the potted or part 10 will not move as a result of melt contraction during subsequent cooling. The water coolant should be preferably at a temperature of from 45° to 55° F. (7°–13° C.). After the composition sets hard so that no movement of the workpiece 10 relative to the box 12 will occur, the "scissors" 26 and 28 are released, the filler tube 38 knocked off, and the cooled potted workpiece 10 and box 12 assembly removed from the fixturing device for acceptance of a succeeding assembly in the fixturing device. The residence time in the fixturing device is controlled by the set time of the composition 25 and this time should not exceed 2–3 minutes. Otherwise, there is a severe limitation imposed on production, the cost of which is, of course, substantial.

Cooling of the receptacle 12 and the workpiece 10 after potting causes a slight shrinkage of these parts 10 and 12. However, the filled organic resinous composition hereafter more particularly described has a substantially greater shrinkage thus continuously drawing in additional amounts of melt from the reservoir tube 38. As the entire system warms back to room temperature, the expansion of both the workpiece 10 and the organic resinous composition causes pressure contact of the composition with the tool 10 and the receptacle 12.

Although preheating of the receptacle 12 and the the workpiece 10 is not required, it does promote adhesion of the organic resinous composition to the metal surface. It also allows a lowering of the melt casting temperature. The temperature of the preheat should not be so high as to unduly increase the subsequent cool down time from the preferred 2-3 minutes to solidification. A temperature of 115°-130° F. (46°-55° C.) is usually sufficient and the parts at these temperatures can be handled without gloves.

THE POTTING COMPOSITION

The preferred filled organic resin system of the present invention provides sufficient hardness and toughness at ambient temperatures essential to holding the workpiece 10 during the machining process. This composition also has a surface tack necessary to provide the required adhesion of the material to the workpiece container 12 and to the workpiece 10. Holding strengths of from 2000 to 5000 pounds as a measure of fracture strength have been obtained with the compositions hereof in potting relation with a jet engine airfoil. These strengths are determined as the axial load required to break loose a jet engine airfoil, for example, from its potted condition in a matrix box 12.

In accordance with the Lapac patent supra, the reinforcing material for his organic system is in the form of macrosized balls or stones in the range of ⅛ inch to 2/10 inch in diameter. In accordance with the present invention, the reinforcing material is in the form of a very finely divided inorganic material.

Any finely divided inert inorganic filler material may be used in the potting compositions of this invention in an amount up to its critical pigment-volume concentration in a given organic moiety as described below. There are, of course, thousands of inorganic filler materials which are useful herein and no purpose is served by attempting to identify all of them by name. However, a few illustrative specific examples of inorganic filler materials include, metal oxides such as aluminum oxide, zirconium oxide, silicon dioxide, iron oxide, barium oxide, calcium oxide, magnesium oxide; carbonates such as calcium carbonate, magnesium carbonate, barium carbonate; sulfates such as magensium sulfate, barium sulfate, calcium sulfate; silicates such as calcium silicate, hydrous aluminum silicate, magnesium silicate; asbestos powder, glass fibers, etc; metal powders, e.g. aluminum, iron, steel, copper, etc; clays, such as fuller's earth, china clay, attapulgus clay etc. Mixtures of two or more fillers may be used if desired. The nature of the workpiece and its susceptibility to contamination will dictate the kind of inorganic filler used. Aluminum oxide, for example, is particularly satisfactory for use in potting jet engine blades.

The inorganic filler has three main purposes in these compositions, i.e., to reduce cool down time for removal of the potted part from the fixturing apparatus for further cooling, to reduce cost by diluting the more costly organic moiety, and to minimize shrinkage of the resin. Preferred inorganic fillers are finely divided ceramic oxides, e.g. aluminum oxide, beryllia, zirconia, calcium carbonate, etc.

The inorganic moiety of the compositions hereof constitutes broadly from 5% to 70% by weight of the entire composition, the balance being the above-mentioned organic moiety. The amount of the inorganic moiety is, however, insufficient to exceed the critical pigment volume concentration of the system on a volume basis.

By "finely divided" as used herein is meant having a particle size such that at least 95% of the material will pass through a 200 mesh U.S. standard screen series sieve. In general, particle sizes and distribution characteristics of coating composition pigments are applicable in the present compositions. A particle size of 95%–325 mesh is typical of a useful and preferred particle dimension.

The upper limit of concentration of the powdered filler is critical to the integrity of the work holding material. Above a certain amount, there appears to be too little of the resinous material to adequately bind the filler and as excessive amounts of filler are added, the mass becomes weaker and thus progressively less useful as a potting compound. Thus, there appears to be a critical filler to binder volume ratio which cannot be exceeded not at all unlike the critical pigment-volume concentration (CPVC) known in paint technology for pigments dispersed in a drying oil vehicle. This CPVC ratio is dependent upon a number of factors including the nature of the resin, the particle size of the filler, and the crystalline form of the filler, etc. Reference may be had to the paper by Van Loo delivered at the Mattiello Lecture in 1956 and published in the December 1956 issue of the Official Digest of Paint and Varnish clubs and entitled "Physical Chemistry of Paint Coatings, a Constant Search — Critical Pigment Volume Concentration". See also Asbeck et al., I. & E. Chem. vol. 41, page 1470, 1949 and U.S. Pat. No. 2,751,782. The "CPVC" is readily determined for each inorganic filler moiety in each organic moiety and will in each case be different. The CPVC is critical, finite and must not be exceeded in these compositions.

The lower limit of concentration of the filler is not critical, although at least 5% by weight thereof is required before significant advantage in quench time and in shrinkage characteristic is realized. Best results are secured when the weight % of the inorganic filler is in the range of 50% to 70% of the entire composition for inorganic fillers having a density of 2 to 6. This corresponds to a volume ratio of filler to resin in the range of 20% to about 40% for materials such as aluminum oxide.

The thermoplastic hot melt organic resinous portion of the compositions of the present invention is a normally solid organic moiety which is preferably mainly of polymeric hydrocarbon derivation. The polymer, or mixture of polymers, preferably has a softening point of about 200° F. (93° C.). The properties of the resinous material are enhanced by the inclusion therein of a high molecular weight organic carboxylic acid component, preferably a dimeric unsaturated fatty acid, such as dilinoleic acid. These acids are commercially available as "dimer acids" and usually contain a total of from 32–40 carbon atoms and result from the dimerization of poly-unsaturated fatty acids containing from 16–20 carbon atoms and identified herein, for example, as "$C_{16}$–$C_{18}$" dimer acids, a commercial dimerization product of mixed $C_{16}$–$C_{18}$ polyunsaturated fatty acids. These materials when admixed in the compositions of the present invention improve the adhesion, and cohesion, and render the compositions of normal temperatures less friable. From 5 to 20 parts by weight of this organic carboxylic acid component are utilized.

A second principal ingredient in the organic moiety is a nonpolar polymer substance, or mixture of polymeric substances, preferably a hydrocarbon polymer. Best results are secured when the hydrocarbon polymer portion of the resinous composition is formed from a mixture of two polymeric hydrocarbon materials, one of which is aliphatic in origin and the other of which is aromatic and petroleum in origin. A particularly satisfactory class of aliphatic hydrocarbon polymers are those which are formed from mono- and polyunsaturated $C_5$–$C_6$ hydrocarbons which condense to a terpene structure. A particularly satisfactory example is a copolymer of 2-methyl-2-butene and 1,3-pentadiene. A commercial product of this class is known as "Wingtack". This resin is an inter polymerization product of alkylene hydrocarbons having substantially the following analysis:

| Materials | Percent by Weight |
|---|---|
| 2-pentene | 4.8% |
| 2-methyl-2-butene | 42.2% |
| Isoprene | 2.5% |
| 1,3-pentadiene | 42.4% |
| 2,3-dimethyl-1-butene | 2.3% |
| Unsaturated $C_5$—$C_6$ hydrocarbons | 5.5% |

The presence of such an aliphatic hydrocarbon resin is desired to enhance cohesion within the thermoplastic hot melt composition body itself. The broad range for the polymeric aliphatic hydrocarbon resin content in the present composition is from about 10 to about 20 parts by weight. These $C_5$–$C_6$ alkylene hydrocarbon polymers are nonpolar and tacky, have a molecular weight of from about 1000 to 1400, and have a softening point by the well known ring and ball method of from about 95° to 120° F. These materials are also known as polyterpenes. They have excellent heat stability, a low acid number (less than 1.0) and a very low ash content (0.1% max.). Such a material be used as the sole polymeric ingredient in some cases.

A second polymeric material particularly useful in the compositions of the present invention is a polymer derived from petroleum derivatives which are also hydrocarbons. These hydrocarbons are predominantly aromatic in nature, and include a variety of alkylene substituted phenyl and naphthyl rings. These aromatic hydrocarbon resins are formed by known catalytic polymerization procedures and, for the purposes of this invention, are desirably those which have a softening point of from 98° to 115° C. as determined by the well known ring and ball method. Usually these resins are obtained commercially as solid flake materials. The viscosity of the material at 25° C. as a 70% solution in toluene is Gardner-Holdt R-U. Such material is commecially available under the trademark "Picco-6100". From 10–20 parts by weight of this second polymeric component are utilized. Use of equal amounts of the aliphatic and aromatic hydrocarbon polymers will be found satisfactory for most purposes. In general, the "parts by weight" are based on 100 parts of the entire composition including both the inorganic and organic moieties.

In composing the potting compositions of the present invention, a preferred procedure involves separate addition of the organic ingredients at elevated temperaures and mechanical stirring in of the inorganic filler over a relatively long period. Thus, the dimer acid is generally heated and stirred in a suitable cooking vessel to about 250° F. (121° C.). The polyterpene is added and stirred in and the temperature raised to 300° F. (149° C.). Then the aromatic hydrocarbon polymer is added and stirred and the temperature elevated to 350° F. (177° C.). Some foaming or bubbling may be experienced at this point. Thereafter, the finely divided inorganic filler is added with stirring while the temperature is held between about 345° to 355° F. (174°–180° C.) for a period of 4 to 5 hours. During the initial portion of the holding period, considerable bubbling has been noted indicative of some chemical reaction occurring. The resultant product, which may be an interpolymer of the organic constituents is stable, thermoplastic and possesses the desired properties for use as a potting compound.

The organic moiety above described may be compounded separately without the filler added in which case it is also useful in fabricating encapsulating compounds which require somewhat different properties. These materials are also filled with inorganic filler and normally injection molded to completely cover a workpiece. To obtain the different properties, small amounts of other critical materials are added such as a monocarboxylic fatty acid, e.g. 3.5 parts by weight stearic acid, methyl cellulose, ethyl cellulose or the like, and an antioxidant, e.g. 0.1 part by weight, 4, $4^1$-methylene bis (2,6 - ditert. butylphenol). Thus, the organic base composition which is believed novel is useful not only as a resinous base for potting compositions, but also as a resin base for encapsulating compounds.

Preferably, the base resin composition contains from 5 to 20 parts by weight of the aliphatic unsaturated dicarboxylic acid, from 10 to about 20 parts by weight of a $C_5$–$C_6$ alkylene hydrocarbon polymer, and from 10–20 parts by weight of an aromatic hydrocarbon polymer. Other ingredients may be present which improve but do not basically alter the properties of the principal ingredients, e.g. antioxidants, bodying agents, plasticizers, $C_{16}$–$C_{20}$ fatty acids, etc.

The following specific examples are illustrative of thermoplastic normally solid hot melt compositions in accordance with the present invention;

EXAMPLE I

A preferred normally solid thermoplastic hot melt composition is prepared by the sequential melt blending of the several organic ingredients as described above into a homogeneous and compatible molten mass. Additions of finely divided inorganic filler material are then made while maintaining the melt temperature so as to obtain a viscosity conducive to good mixing and pourability. Volatilization of any solvent unreacted monomer, depolymerization product, condensation, water, etc., may occur during heating at the time of blending the hydrocarbon polymers. The entire melt should be held at a temperature of 345°–355° F. (174° C.–179° C.) while stirring in the powdered inorganic filler for a period of 4–5 hours. A preferred formulation is as follows:

| Materials | Parts by Weight |
| --- | --- |
| Dilinoleic acid | 10 |
| C$_5$—C$_6$ terpene hydrocarbon polymer | 12 |
| Aromatic hydrocarbon polymer | 13 |
| Aluminum oxide (−325 mesh) | 65 |

The foregoing composition is characterized by the eight properties listed above under the section entitled "Background and Prior Art". The pour temperature is in the range of 250°–260° F. (121°–127° C.) and the breaking load is about 5000 lbs. For fixturing a jet engine blade, a cool down time to set of 2–3 minutes is obtained after which removal from the fixturing jig can be done with further spontaneous or forced cooling. The amount of Aluminum oxide is just below the CPVC for the system.

EXAMPLE II

| Materials | Parts by Weight |
| --- | --- |
| C$_{16}$—C$_{18}$ dimer acids | 9 |
| C$_5$ terpene hydrocarbon polymer (Wingtack 95) | 11 |
| Aromatic hydrocarbon polymer (Picco-6100) | 12 |
| Aluminum oxide (−325 mesh) | 68 |

The foregoing example is illustrative of about the maximum amount of aluminum oxide which can be used satisfactorily in the particular resin combination. At over 70% concentration of aluminum oxide, the composition is too weak for satisfactory use as a potting compound. This latter concentration corresponds to a CPVC of about 32%.

EXAMPLE III

| Materials | Parts by Weight |
| --- | --- |
| C$_{16}$—C$_{18}$ dimer fatty acids | 10 |
| Dipentene polyterpene (M.W. 1100) | 20 |
| Aromatic hydrocarbon polymer (Picco 6100) | 20 |
| Aluminum oxide (−325 mesh) | 50 |

This composition is satisfactory as a fixturing compound, but is somewhat more expensive than the composition of Example II above. The amount of alumina is below the CPVC for the system.

EXAMPLE IV

| Materials | Parts by Weight |
| --- | --- |
| Dilinoleic acid | 13 |
| "Wingtack 95" (C$_5$—C$_6$ polyterpene) | 41 |
| Picco 6100 (Aromatic H.C. polymer) | 41 |
| Aluminum oxide (−325 mesh) | 5.0 |

This composition is satisfactory as a potting compound but is expensive and requires cooling water at about 35° to 38° F. to obtain a satisfactorily short cooling time. Higher concentrations of the ceramic oxide provide shorter cooling times and reduce the cost of the fixturing composition. The volume ratio of the inroganic moiety to the organic moiety is far below the CPVC of the system.

EXAMPLE V

| Materials | Parts by Weight |
| --- | --- |
| Dilinoleic acid | 5 |
| Picco 6100 (Aromatic H.C. Polymer) | 40 |
| Calcium carbonate (−325 mesh) | 55 |

This composition omits the C$_5$–C$_6$ alkylene polymer and utilizes a different inorganic filler to provide a suitable fixturing compound.

EXAMPLE VI

| Materials | Parts by Weight |
| --- | --- |
| Dininoleic acid | 5 |
| Wingtack 95 (aliphatic H.C. polymer) | 45 |
| Aluminum Oxide (−325 mesh) | 35 |
| Iron (−325 mesh) | 15 |

The foregoing composition illustrates a composition utilizing as the hydrocarbon polymer a nonaromatic hydrocarbon polymer. Also illustrated is an inorganic filler which is a mixture of two inorganic fillers, i.e., a ceramic oxide and a powdered metal. The CPVC of the system is not exceeded.

The following Table sets forth specific examples with varying proportions of ingredients and the effect of such variations using preferred ingredients. Jet engine airfoils were potted in apparatus shown in FIGS. 1, 2 and 3 for these tests according to the method described below. The volume ratio in this example is below the CPVC of the system.

A convenient process for fixturing an engine blade or airfoil is as follows: The airfoil 10 and matrix box 12 are degreased by a known procedure, and each preheated to 125° F. to 130° F. in a suitable electric oven. The removable inlet pipe 38 is similarly preheated. The composition of any of the foregoing examples, e.g. example I is heated to 255° F. in a suitable agitated pot. It is desirable also to preheat the spigot on the melt pot to at least 200° F.

The airfoil 10 and matrix box 12 are clamped in a suitable locating holder, closure scissors 26, 28 attached to the Teflon washer 34 and inlet pipe 38 put into place, and the fixturing composition 25 flowed into the box 12 until the inlet pipe 38 is nearly full. The water spray units 40 are operated at about 55° F. after filling. The matrix box 12 with the part 10 and composition after removing scissors is then immediately immersed in cold water at about 60° F. where it remains for 3 minutes.

Thereafter the removable pipe 38 and the Teflon washer 34 are removed and the assembly dried and gauged for location of the workpiece in the matrix. The potted airfoil and matrix is then set aside to regain room temperature. The machining operation can then be performed.

When completed, the fixtured part assembly may be reheated to about 250° F.,–300° F. the workpiece 10 recovered and washed with a suitable solvent (toluene), and the potting composition returned to the melting pot for reuse.

What is claimed is:

1. A normally solid thermoplastic hot melt composition comprising a dispersion of from 5% to 70% by weight of an inorganic moiety which is a finely divided inorganic filler having a particle size such that 95% passes through a 200 mesh Standard screen and from 95% to 30% by weight of an organic moiety which is a blend of:

(a) 5 to 20 parts by weight of an aliphatic dicarboxylic acid containing from 32 to 40 carbon atoms;

(b) From 10 to about 20 parts by weight of a $C_5$–$C_6$ alkylene hydrocarbon polymer having a molecular weight in the range of from about 1000 to about 1400; and (c) 10 to 20 parts by weight of a nonpolar aromatic hydrocarbon polymer having a softening point in the range of from about 98° to 115° C. measured by the ring and ball method;

the amount of said inorganic filler on a volume basis being less than the CPVC of the inorganic filler in said organic moiety.

2. A composition in accordance with claim 1 wherein the aliphatic dibasic carboxylic acid is a dimeric fatty acid of an unsaturated monocarboxylic fatty acid containing from 16–20 carbon atoms.

3. A composition in accordance with claim 2 wherein the unsaturated monocarboxylic fatty acid is linoleic.

4. A composition in accordance with claim 1 wherein the alkylene hydrocarbon polymer is one having a molecular weight of 1200 and a softening point of about 100° C. as determined by the ring and ball method.

5. A composition in accordance with claim 4 wherein the alkylene hydrocarbon polymer is a polyterpene.

6. A composition in accordance with claim 5 wherein the polyterpene is a polymer of the following mixture of alkylene hydrocarbons:

| | |
|---|---|
| 2-pentene | 4.8% |
| 2-methyl-2-butene | 42.2% |
| Isoprene | 2.5% |
| 1,3-pentadiene | 42.4% |
| 2,3-dimethyl-1-butene | 2.3% |
| Unsat. $C_5$—$C_6$ hydrocarbons | 5.7% |

7. A composition in accordance with claim 1 wherein the nonpolar aromatic hydrocarbon polymer is one having a softening point in the range of 98–102, an acid number less than 1 and a saponification value less than 1.

8. A composition in accordance with claim 1 wherein the inorganic filler material is a ceramic oxide.

9. A composition in accordance with claim 8 wherein the ceramic oxide is aluminum oxide.

10. A composition in accordance with claim 8 wherein the aluminum oxide has a particle size such that at least 95% passes through a 325 mesh screen.

11. A composition in accordance with claim 1 wherein the aliphatic dicarboxylic acid is dilinoleic acid in an amount of from 5 to 10 parts by weight; the $C_5$–$C_6$ alkylene hydrocarbon polymer is a polymer of the following mixture of alkylene hydrocarbons:

| | |
|---|---|
| 2-pentene | 4.8% |
| 2-methyl-2-butene | 42.2% |
| Isoprene | 2.5% |
| 1,3-pentadiene | 42.4% |
| 2,3-dimethyl-1-butene | 2.3% | having a molecular weight of 1200 and present in an amount of from 12 to 14 parts by weight; the nonpolar aromatic hydrocarbon polymer has a softening point in the range of 98–102, an acid number less than 1, and a saponification number less than 1 and is present in an amount of about 13 parts by weight; and from 60% to 68% by weight of powdered aluminum oxide having a particle size such that at least 95% passes through a 325 mesh screen.

12. In the process of holding a workpiece in a workholder, the steps of:

(a) positioning the workpiece in the workholder;

(b) heating to a liquid state a normally solid thermoplastic workholding composition comprising a dispersion of from 5% to 70% by weight of an inorganic moiety which is a finely divided inorganic filler having a particle size such that 95% passes through a 200 mesh standard screen, in from 95% to 30% by weight of an organic moiety which is a physical melt blend of:

(1) 5 to 20 parts by weight of an aliphatic dicarboxylic acid containing from 32 to 40 carbon atoms;

(2) From about 10 to 20 parts by weight of a $C_5$–$C_6$ alkylene hydrocarbon polymer having a molecular weight in the range of from about 1000 to 1400; and (3) 10 to 20 parts by weight of a nonpolar aromatic hydrocarbon polymer having a softening point in the range of from about 98° to 115° C. measured by the ring and ball method;

(c) introducing said composition while at a temperature of from 250° to about 300° F. into said workholder to surround said workpiece;

(d) quenching said workholder, workpiece and said workholding composition to a solidification temperature with cold water.

13. A process in accordance with claim 12 wherein the alkylene hydrocarbon polymer is one having a molecular weight of 1200 and a softening point of about 100° C. as determined by the ring and ball method.

14. A process in accordance with claim 13 wherein the alkylene hydrocarbon polymer is a polyterpene.

15. A process in accordance with claim 14 wherein the polyterpene is a polymer of the following mixture of alkylene hydrocarbons:

| | |
|---|---|
| 2-pentene | 4.8% |
| 2-methyl-2-butene | 42.2% |
| Isoprene | 2.5% |
| 1,3-pentadiene | 42.4% |
| 2,3-dimethyl-1-butene | 2.3% |
| Unsat. $C_5$—$C_6$ hydrocarbons | 5.7% |

16. A normally solid thermoplastic resin base formed by blending at a temperature above 200° F.

(a) 5 to 20 parts by weight of an aliphatic dicarboxylic acid containing from 32 to 40 carbon atoms;

(b) From 10 to about 20 parts by weight of a $C_5$–$C_6$ alkylene hydrocarbon polymer having a molecular weight in the range of from about 1000 to about 1400; and (c) 10 to 20 parts by weight of a nonpolar aromatic hydrocarbon polymer having a softening point in the range of from about 98° to 115° C. measured by the ring and ball method.

17. A composition in accordance with claim 16 wherein the aliphatic dibasic carboxylic acid is a dimeric fatty acid of an unsaturated monocarboxylic fatty acid containing from 16–20 carbon atoms.

18. A composition in accordance with claim 17 wherein the unsaturated monocarboxylic fatty acid is linoleic.

19. A composition in accordance with claim 16 wherein the nonpolar aromatic hydrocarbon polymer is one having a softening point in the range of 98–102, an acid number less than 1 and a saponification value less than 1.

* * * * *